(12) United States Patent
Auyeung

(10) Patent No.: US 8,160,141 B2
(45) Date of Patent: Apr. 17, 2012

(54) ADVANCED VIDEO CODED PICTURES—REDUCED COST COMPUTATION OF AN INTRA MODE DECISION IN THE FREQUENCY DOMAIN

(75) Inventor: Cheung Auyeung, Sunnyvale, CA (US)

(73) Assignees: Sony Corporation, Tokyo (JP); Sony Electronics Inc., Park Ridge, NY (US)

( * ) Notice: Subject to any disclaimer, the term of this patent is extended or adjusted under 35 U.S.C. 154(b) by 1048 days.

(21) Appl. No.: 12/049,864

(22) Filed: Mar. 17, 2008

(65) Prior Publication Data

US 2009/0232210 A1  Sep. 17, 2009

(51) Int. Cl.
*H04N 11/02* (2006.01)
(52) U.S. Cl. ............... 375/240.13; 375/240.24
(58) Field of Classification Search .......... 375/240.13, 375/240.24
See application file for complete search history.

(56) References Cited

U.S. PATENT DOCUMENTS

| | | | |
|---|---|---|---|
| 7,027,510 | B2 | 4/2006 | Auyeung |
| 2002/0159644 | A1* | 10/2002 | Sakuyama ............ 382/240 |
| 2006/0209948 | A1 | 9/2006 | Bialkowski et al. |
| 2006/0251330 | A1 | 11/2006 | Toth et al. |
| 2007/0009027 | A1 | 1/2007 | Zhu et al. |
| 2007/0053433 | A1* | 3/2007 | Song ............ 375/240.13 |
| 2007/0171978 | A1* | 7/2007 | Chono ............ 375/240.18 |

FOREIGN PATENT DOCUMENTS

EP   1727370 A1   11/2006

OTHER PUBLICATIONS

Z. Lei et al. Accurate Bit Allocation and Rate Control for DCT Domain Video Transcoding. Proceedings of the 2002 IEEE Canadian Conference on Electrical & Computer Engineering, Mar. 2002.
S-C. Chang et al. A Novel Rate Predictor Based on Quantized DCT Indices and its Rate Control Mechanism (Abstract). Signal Processing: Image Communication, vol. 18, No. 6, Jul. 2003, pp. 427-441.
S. Mallat et al. Analysis of low bit rate image transform coding. IEEE Trans. on Signal Processing, vol. 46, No. 4, pp. 1027-1042 (1998).
S. Milani et al. A rate control algorithm for the H.264 encoder. IEEE Trans. on Circuits and Systems for Video Technology, vol. 18, No. 2, Feb. 2008, pp. 257-262.

(Continued)

*Primary Examiner* — Dang Ton
*Assistant Examiner* — Mohamed Kamara
(74) *Attorney, Agent, or Firm* — John P. O'Banion

(57) ABSTRACT

A method of intra mode prediction uses a block of pixels and their horizontal $H_{pos}$ and vertical $V_{pos}$ pixel positions and adjacent horizontal and vertical pixels within an input picture frame signal as inputs for a method for selecting a lowest Sum of Absolute Transformed Differences (SATD) intra mode among intra modes among the horizontal, vertical, and steady state (DC) intra modes for use in advanced video coding algorithms, such as MPEG-4 Part 10 and H.264/AVC. Associated costs are calculated for each of the intra modes are used to select the output of the best intra mode. The method reduces the unimproved computational cost of three 2D 4×4 Hadamard transformations (which is equivalent to 24 1D 4 point transformations) to just 4 1D 4 point transformations for a significant computational improvement. As horizontal and vertical panning is frequently used in video imagery, this improvement may reduce encoder processing by 80%.

21 Claims, 6 Drawing Sheets

OTHER PUBLICATIONS

Z. He et al. Low-Delay Rate Control for DCT Video Coding via p-Domain Source Modeling. IEEE Trans. on Circuits and Systems for Video Technology, vol. 11, No. 8, Aug. 2001, pp. 928-940.

Z. He et al. A unified rate-distortion analysis framework for transform coding. IEEE Trans. on Circuits and Systems for Video Technology, vol. 11, No. 12, Dec. 2001, pp. 1221-1236.

I. Richardson. Vcodex White Paper: An overview of H.264 Advanced Video Coding, Mar. 2007.

I. Richardson. www.vcodex.com H.264 / MPEG-4 Part 10 White Paper (Intra Prediction), dated Apr. 30, 2003.

I. Richardson. www.vcodex.com H.264 / MPEG-4 Part 10 White Paper (Overview), dated Jul. 10, 2002.

Liang et al. MPEG-4 to H.264/AVC Transcoding, IWCMC '07, Aug. 12-16, 2007, pp. 689-693.

Yu et al. A Frequency Domain Approach to Intra Mode Selection in H264/AVC, Proc. of 13th European Signal Processing Conference (EUSIPCO) '05, Antalya, Turkey, Sep. 2005.

Tsukuba et al., H.264 Fast Intra-Prediction Mode Decision Based on Frequency Characteristic, Proc. of the 13 European Signal Processing Conference (EUSIPCO) '05, Antalya, Turkey, Sep. 2005.

Kim et al., Fast H.264 Intra-Prediction Mode Selection Using Joint Spatial and Transform Domain Features, J. Visual Comm. and Image Representation, vol. 17, No. 2, pp. 291-310 (2006), available online Jul. 1, 2005.

* cited by examiner

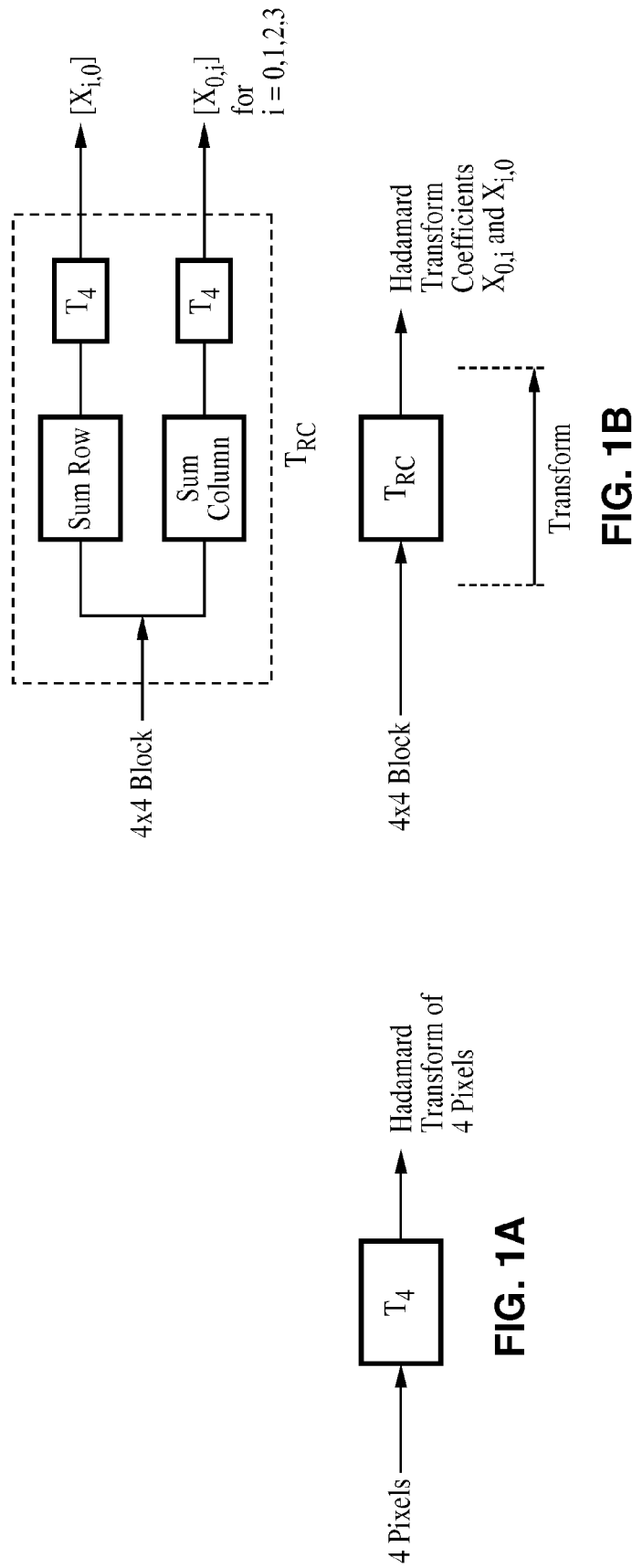

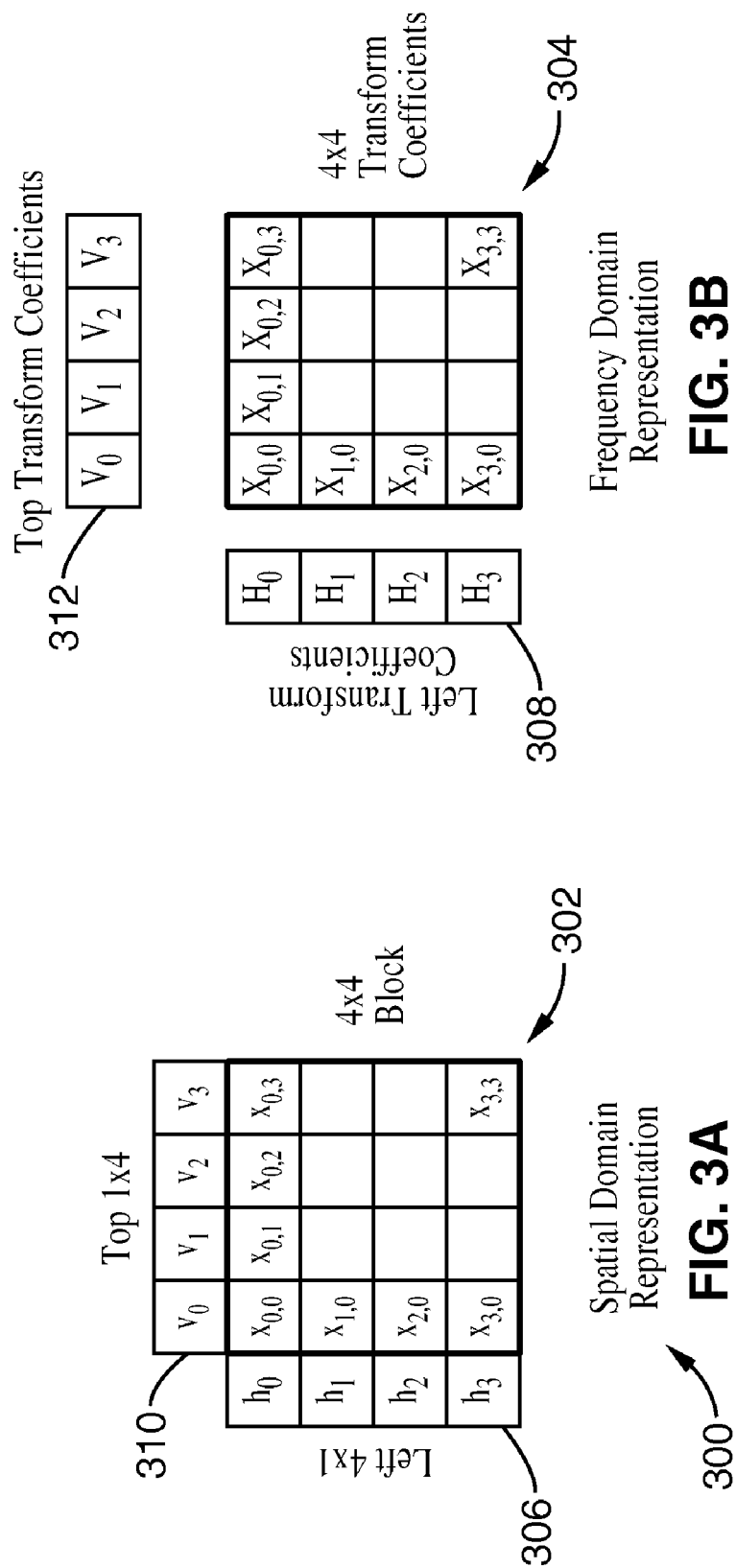

ADVANCED VIDEO CODED PICTURES—REDUCED COST COMPUTATION OF AN INTRA MODE DECISION IN THE FREQUENCY DOMAIN

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to video encoding, and more particularly to intra mode decisions within advanced video encoding (such as H.264/AVC or MPEG-4 Part 10) standards.

2. Description of Related Art

H.264/AVC, alternatively known as MPEG-4 Part 10 and by several other monikers, is representative of improved data compression algorithms. Improved data compression, however, comes at the price of greatly increased computational requirements during the encoding processing phase.

In particular, the H.264/AVC contains a very computationally expensive section where an optimal intra mode is calculated that yields the lowest sum of absolute transformed differences (or SATD) between an input 4×4 pixel block, and its compressed version. Examples of prior attempts to reduce this computational cost include A. C. Yu, G. R. Martin, and H. Park, in "A Frequency Domain Approach to Intra Mode Selection in H.264/AVC", incorporated by reference in its entirety, U.S. patent publication US 2006/0209948 A1, incorporated herein by reference in its entirety, and U.S. patent publication US 2006/0251330 A1, incorporated herein by reference in its entirety.

BRIEF SUMMARY OF THE INVENTION

Accordingly, one aspect of the invention is a method of selecting an intra mode in a video image encoder, comprising:

(a) selecting a lowest Sum of Absolute Transformed Differences (SATD) intra mode among intra modes while using $[x]$, $\vec{h}$, $\vec{v}$, $H_{pos}$, $V_{pos}$;

(b) wherein $[x]$ is a 4×4 block of pixels within a picture and $$[x] \equiv \begin{bmatrix} x_{0,0} & x_{0,1} & x_{0,2} & x_{0,3} \\ x_{1,0} & x_{1,1} & x_{1,2} & x_{1,3} \\ x_{2,0} & x_{2,1} & x_{2,2} & x_{2,3} \\ x_{3,0} & x_{3,1} & x_{3,2} & x_{3,3} \end{bmatrix}, \vec{h} = \begin{bmatrix} x_{0,-1} \\ x_{1,-1} \\ x_{2,-1} \\ x_{3,-1} \end{bmatrix},$$

and $$\vec{v} = \begin{bmatrix} x_{-1,0} \\ x_{-1,1} \\ x_{-1,2} \\ x_{-1,3} \end{bmatrix};$$

(c) wherein $H_{pos}$ is a horizontal pixel position of the 4×4 block within the image;

(d) wherein $V_{pos}$ is a vertical pixel position of the 4×4 block within the image;

(e) wherein the lowest SATD intra mode is determined among a group comprising: (i) a horizontal intra mode; (ii) a vertical intra mode; and (iii) a steady state (DC) intra mode; and (f) outputting the lowest SATD intra mode.

The outputting step may comprise:

(a) calculating a horizontal predictor $\vec{H} \equiv (H_0, H_1, H_2, H_3)^T$, a vertical predictor $\vec{V} \equiv (V_0, V_1, V_2, V_3)^T$, and a steady state (DC) predictor D;

(b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and (c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

The calculating of the horizontal predictor $\vec{H}$, the vertical predictor $\vec{V}$, and the steady state (DC) predictor D may comprise:

(a) if $H_{pos} \neq 0$ and $V_{pos} \neq 0$ then:

i. setting $\vec{H} = [T_4]\vec{h}$ wherein $\vec{h} \equiv (h_0, h_1, h_2, h_3)^T \equiv (x_{0,-1}, x_{1,-1}, x_{2,-1}, x_{3,-1})^T$, ii. setting $\vec{V} = [T_4]\vec{v}$ wherein $\vec{V} \equiv (v_0, v_1, v_2, v_3) \equiv (x_{-1,0}, x_{-1,1}, x_{-1,2}, x_{-1,3})^T$, and iii. setting $D = (H_0 + V_0)/2$;

(b) if $H_{pos} = 0$ and $V_{pos} \neq 0$ then:

i. setting $\vec{H} = (2^{15}-1, 0, 0, 0)^T$, ii. setting $\vec{V} = [T_4]\vec{v}$ wherein $\vec{v} \equiv (v_0, v_1, v_2, v_3) \equiv (x_{-1,0}, x_{-1,1}, x_{-1,2}, x_{-1,3})^T$, and iii. setting $D = V_0$;

(c) if $H_{pos} \neq 0$ and $V_{pos} = 0$ then:

i. setting $\vec{H} = [T_4]\vec{h}$ wherein $\vec{h} \equiv (h_0, h_1, h_2, h_3)^T \equiv (x_{0,-1}, x_{1,-1}, x_{2,-1}, x_{3,-1})^T$, ii. setting $\vec{V} = (2^{15}-1, 0, 0, 0)^T$, and iii. setting $D = H_0$;

(d) if $H_{pos} = 0$ and $V_{pos} = 0$ then:

i. setting $\vec{H} = (2^{15}-1, 0, 0, 0)^T$, ii. setting $\vec{V} = (2^{15}-1, 0, 0, 0)^T$, and iii. setting $D = 128 \times 16$.

A relatively inefficient calculation of the horizontal cost precursor $C_{hs}$ and the vertical cost precursor $C_{vs}$ may begin with steps comprising: (a) calculating the values $X_{i,0}$, $X_{0,i}$ for $i \in 0, 1, 2, 3$ using the relationship $$[X] = [T_4][x][T_4]^T,$$

where $$[X] \equiv \begin{bmatrix} X_{0,0} & X_{0,1} & X_{0,2} & X_{0,3} \\ X_{1,0} & X_{1,1} & X_{1,2} & X_{1,3} \\ X_{2,0} & X_{2,1} & X_{2,2} & X_{2,3} \\ X_{3,0} & X_{3,1} & X_{3,2} & X_{3,3} \end{bmatrix}.$$

This method is computationally inefficient, as only the $X_{i,0}$, $X_{0,i}$ for $i \in 0, 1, 2, 3$ values are required. Thus, 9 of 16 values are not required.

In another aspect of the invention, a more computationally efficient calculation of the $X_{i,0}$, $X_{0,i}$ for i∈0, 1, 2, 3 values may comprise: providing the input [x] matrix and the $[T_4]$ matrix; then calculating:

$$\begin{bmatrix} X_{0,0} \\ X_{1,0} \\ X_{2,0} \\ X_{3,0} \end{bmatrix} = [T_4][x]\vec{u}$$

and $$\begin{bmatrix} X_{0,0} & X_{0,1} & X_{0,2} & X_{0,3} \end{bmatrix} = \vec{u}^T[x][T_4]^T$$

where $\vec{u}^T = [1\ 1\ 1\ 1]$.

After calculating the $X_{i,0}$, $X_{0,i}$ for i∈0, 1, 2, 3 values, then the horizontal cost precursor $$C_{hs} = \sum_{i=1}^{3} |X_{i,0}|$$

and vertical cost precursor $$C_{vs} = \sum_{j=1}^{3} |X_{0,j}|$$

may be calculated.

The horizontal intra mode cost $C_H$ may then be calculated by $$C_H = \sum_{i=0}^{3} |H_i - X_{i,0}| + C_{vs}.$$

The vertical intra mode cost $C_V$ may be calculated by $$C_V = \sum_{j=0}^{3} |V_j - X_{0,j}| + C_{hs}.$$

The steady state (DC) intra mode cost $C_D$ may be calculated by $C_D = |D - X_{0,0}| + C_{hs} + C_{vs}$.

The calculating may further comprise: selecting the lowest SATD intra mode with a lowest associated intra mode cost among the group consisting of: the horizontal intra mode cost $C_H$, the vertical intra mode cost $C_V$, and the steady state (DC) intra mode cost $C_D$. This calculating process is typically achieved through a series of logical operations.

Another aspect of the invention is a computer readable medium comprising a programming executable capable of performing on a computer the method described above.

A still further aspect of the invention is an advanced video encoder comprising the method described above. This advanced video encoder may take the form of a specially designed video encoder signal processor embedded within a consumer device, such as a hand held high definition television (HDTV) device.

Yet another aspect of the invention is a method of intra mode prediction, that comprises:

(a) providing a 4×4 block of pixels [x] within a picture, wherein $$[x] \equiv \begin{bmatrix} X_{0,0} & X_{0,1} & X_{0,2} & X_{0,3} \\ X_{1,0} & X_{1,1} & X_{1,2} & X_{1,3} \\ X_{2,0} & X_{2,1} & X_{2,2} & X_{2,3} \\ X_{3,0} & X_{3,1} & X_{3,2} & X_{3,3} \end{bmatrix};$$

(b) providing 4 pixels $$\vec{h} = \begin{bmatrix} x_{0,-1} \\ x_{1,-1} \\ x_{2,-1} \\ x_{3,-1} \end{bmatrix}$$

immediately to the left of the bock [x] in the picture when available;

(c) providing 4 pixels $$\vec{v} = \begin{bmatrix} x_{-1,0} \\ x_{-1,1} \\ x_{-1,2} \\ x_{-1,3} \end{bmatrix}$$

immediately above the block [x] in the picture when available;

(d) providing a horizontal pixel position ($H_{pos}$) of the 4×4 block within the picture;

(e) providing a vertical pixel position ($V_{pos}$) of the 4×4 block within the picture; and (f) outputting a lowest Sum of Absolute Transformed Differences (SATD) intra mode among intra modes while using [x], $\vec{h}$, $\vec{v}$, $H_{pos}$, $V_{pos}$, wherein the lowest SATD intra mode is selected from the group consisting of: i. a horizontal intra mode; ii. a vertical intra mode; and iii. a steady state (DC) intra mode.

The 4×4 pixel block [x] is typically oriented in the same sense as the original picture it is taken from, i.e. the indices increase in the same directions both horizontally and vertically. (Note that in the H.264 standard, the orientation is that pixel coordinate 0,0 is at the upper left of the picture.) In this orientation, the $\vec{h}$ is immediately adjacent to the left side of the 4×4 pixel block [x], and the $\vec{v}$ is immediately adjacent the top of the 4×4 pixel block [x].

It is readily apparent that the methods above may be easily modified for $\vec{h}$ aligned on the right edge of the 4×4 pixel block [x], and the $\vec{v}$ may be aligned with the bottom of the 4×4 pixel block [x]. Similarly, the picture or the 4×4 pixel block [x] indices may be readily reoriented with the orientation of pixel 0,0 being in any quadrant, while still performing the methods described here.

Additionally, the methods described herein may be readily applied to other H.264 pixel blocks, such as the 16×16 macroblock, or indeed generalized to block of size p×q where p and q may be independently selected from a group consisting of 2, 4, 8, 16, 32, 64, and 128.

In another aspect of the invention, the aforementioned steps may be incorporated into a more generalized method.

The resultant generalized method of selecting an intra mode in a video image encoder may comprise:

(a) selecting a lowest Sum of Absolute Transformed Differences (SATD) intra mode among intra modes using inputs [x], $H_{pos}$, $V_{pos}$, $\vec{h}$, and $\vec{v}$;

(b) wherein [x] is a p×q block of pixels within a picture with indices $x_{i,j}$ for i∈0, 1, 2, . . . , p−1, j∈0, 1, 2, . . . , q−1; and $$[x] \equiv \begin{bmatrix} x_{0,0} & x_{0,1} & \cdots & x_{0,q-1} \\ x_{1,0} & x_{1,1} & \cdots & x_{1,q-1} \\ \vdots & \vdots & \ddots & x_{2,q-1} \\ x_{p-1,0} & x_{p-1,1} & x_{p-1,2} & x_{p-1,q-1} \end{bmatrix}$$

(c) wherein $H_{pos}$ is a horizontal pixel position of the p×q block within the image;

(d) wherein $V_{pos}$ is a vertical pixel position of the p×q block within the image;

(e) wherein $\vec{h}$ is a horizontal vector immediately left of the p×q block [x], defined as $\vec{h} \equiv (x_{0,-1}, x_{1,-1}, \ldots, x_{p-1,-1})^T$ relative to the indexing of the elements of [x];

(f) wherein $\vec{v}$ is a horizontal vector immediately above the p×q block [x], defined as $\vec{v} \equiv (x_{-1,0}, x_{-1,1}, \ldots, x_{-1,q-1})^T$ relative to the indexing of the elements of [x];

(g) wherein b is the bit depth of a pixel in the picture; (h) wherein the lowest SATD intra mode is determined among a group comprising:
  i. a horizontal intra mode;
  ii. a vertical intra mode; and
  iii. a steady state (DC) intra mode; and (i) outputting the lowest SATD intra mode to a computer readable medium.

The selecting step may comprise:

(a) calculating a horizontal predictor $\vec{H} \equiv (H_0, H_1, \ldots, H_{p-1})^T$, a vertical predictor $\vec{V} \equiv (V_0, V_1, \ldots, V_{q-1})^T$, and a steady state (DC) predictor D;

(b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and (c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

In the method above, the calculating a horizontal predictor $\vec{H}$, a vertical predictor $\vec{V}$, and a steady state (DC) predictor D may comprise:

(a) if $H_{pos} \neq 0$ and $V_{pos} \neq 0$ then: (i) setting $\vec{H} = [T_{pq}]\vec{h}$ wherein $\vec{h} \equiv (h_0, h_1, \ldots, h_{p-1})^T \equiv (x_{0,0}, x_{1,0}, \ldots, x_{p-1,0})^T$ (ii) setting $\vec{V} = [T_{pq}]\vec{v}$ wherein $\vec{v} \equiv (v_0, v_1, \ldots, v_{q-1}) \equiv (x_{0,0}, x_{0,1}, \ldots, x_{0,q-1})^T$; and (iii) setting $D = (H_0 + V_0)/2$;

(b) if $H_{pos} = 0$ and $V_{pos} \neq 0$ then: (i) setting $\vec{H} = (2^{15}-1, 0, 0, 0)^T$ wherein m is defined as $2^m \geq p \times p \times q \times 2^{b+1}$; (ii) setting $\vec{V} = [T_{pq}]\vec{v}$ wherein $\vec{v} \equiv (v_0, v_1, \ldots, v_q) \equiv (x_{0,0}, x_{0,1}, \ldots, x_{0,q})^T$; and (iii) setting $D = V_0$;

(c) if $H_{pos} \neq 0$ and $V_{pos} = 0$ then: (i) setting $\vec{H} = [T_{pq}]\vec{h}$ wherein $\vec{h} \equiv (h_0, h_1, \ldots, h_{p-1})^T \equiv (x_{0,0}, x_{1,0}, \ldots, x_{p-1,0})^T$; (ii) setting $\vec{V} = (2^{15}-1, 0, 0, 0)^T$ wherein n is defined as $2^n \geq q \times p \times q \times 2^{b+1}$; and (iii) setting $D = H_0$; and (d) if $H_{pos} = 0$ and $V_{pos} = 0$ then: (i) setting $\vec{H} = (2^{15}-1, 0, 0, 0)^T$ wherein m is defined as $2^m \geq p \times p \times q \times 2^{b+1}$; (ii) setting $\vec{V} = (2^{15}-1, 0, 0, 0)^T$ wherein n is defined as $2^n \geq q \times p \times q \times 2^{b+1}$; and (iii) setting $D = 128 \times 16$.

The horizontal cost precursor $C_{hs}$ and the vertical cost precursor $C_{vs}$ may be calculated by steps comprising:

(a) calculating the values $X_{i,0}$, $X_{0,j}$ for i∈0, 1, 2, . . . , p−1, j∈0, 1, 2, . . . , q−1 using the relationship $[X] = [T_{pq}][x][T_{pq}]^T$ where $$[X] \equiv \begin{bmatrix} X_{0,0} & X_{0,1} & \cdots & X_{0,q-1} \\ X_{1,0} & X_{1,1} & \cdots & X_{1,q-1} \\ \vdots & \vdots & \ddots & X_{2,q-1} \\ X_{p-1,0} & X_{p-1,1} & X_{p-1,2} & X_{p-1,q-1} \end{bmatrix};$$

(b) calculating the horizontal cost precursor $$C_{hs} = \sum_{i=1}^{p-1} |X_{i,0}|; \text{ and}$$

(c) calculating the vertical cost precursor $$C_{vs} = \sum_{j=1}^{q-1} |X_{0,j}|.$$

The horizontal intra mode cost $C_H$ may be calculated using steps comprising: calculating $$C_H = \sum_{i=0}^{p-1} |H_i - X_{i,0}| + C_{vs}.$$

Similarly, the vertical intra mode cost $C_V$ may be calculated with steps comprising: calculating $$C_V = \sum_{j=0}^{q-1} |V_j - X_{0,j}| + C_{hs}.$$

Finally, the steady state (DC) intra mode cost $C_D$ may be calculated with steps comprising: calculating $C_D = |D - X_{0,0}| + C_{hs} + C_{vs}$.

In the method above, the calculating means may comprise: selecting the lowest SATD intra mode with a lowest associated intra mode cost among the group consisting of: the horizontal intra mode cost $C_H$, the vertical intra mode cost $C_V$, and the steady state (DC) intra mode cost $C_D$.

In another aspect of the invention, a computer readable medium comprising a programming executable may be capable of performing on a computer the methods described above.

In still another aspect of the invention, the methods of intra mode prediction above may be generalized for: (a) where the p dimension is selected from a group of dimensions consisting of: 2, 4, 8, 16, 32, 64, and 128; and (b) where the q dimension is selected from a group of dimensions consisting of: 2, 4, 8, 16, 32, 64, and 128. Still higher dimensions are also possible, however, they are likely computationally prohibitive nature of the increasingly complex calculations.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1A is a flow chart of a Hadamard transform of a set of 4 pixels into a Hadamard transform of the 4 pixels.

FIG. 1B is a flow chart of a pruned Hadamard transform of a 4×4 block of pixels that produces only the vertical column and horizontal row components of the Hadamard transform of the 4×4 block of pixels.

FIG. 3A is a matrix of the 4×1 vector $\vec{h}$ to the left to the 4×4 block and 1×4 element vector $\vec{v}$ above the 4×4 block.

FIG. 3B is a matrix of the left transform coefficients and top transform coefficients that correspond to the left 4×1 and top 1×4 elements of FIG. 3A depicting the relationship between the spatial and frequency domain intra predictor for the horizontal and vertical modes.

Figure 4:
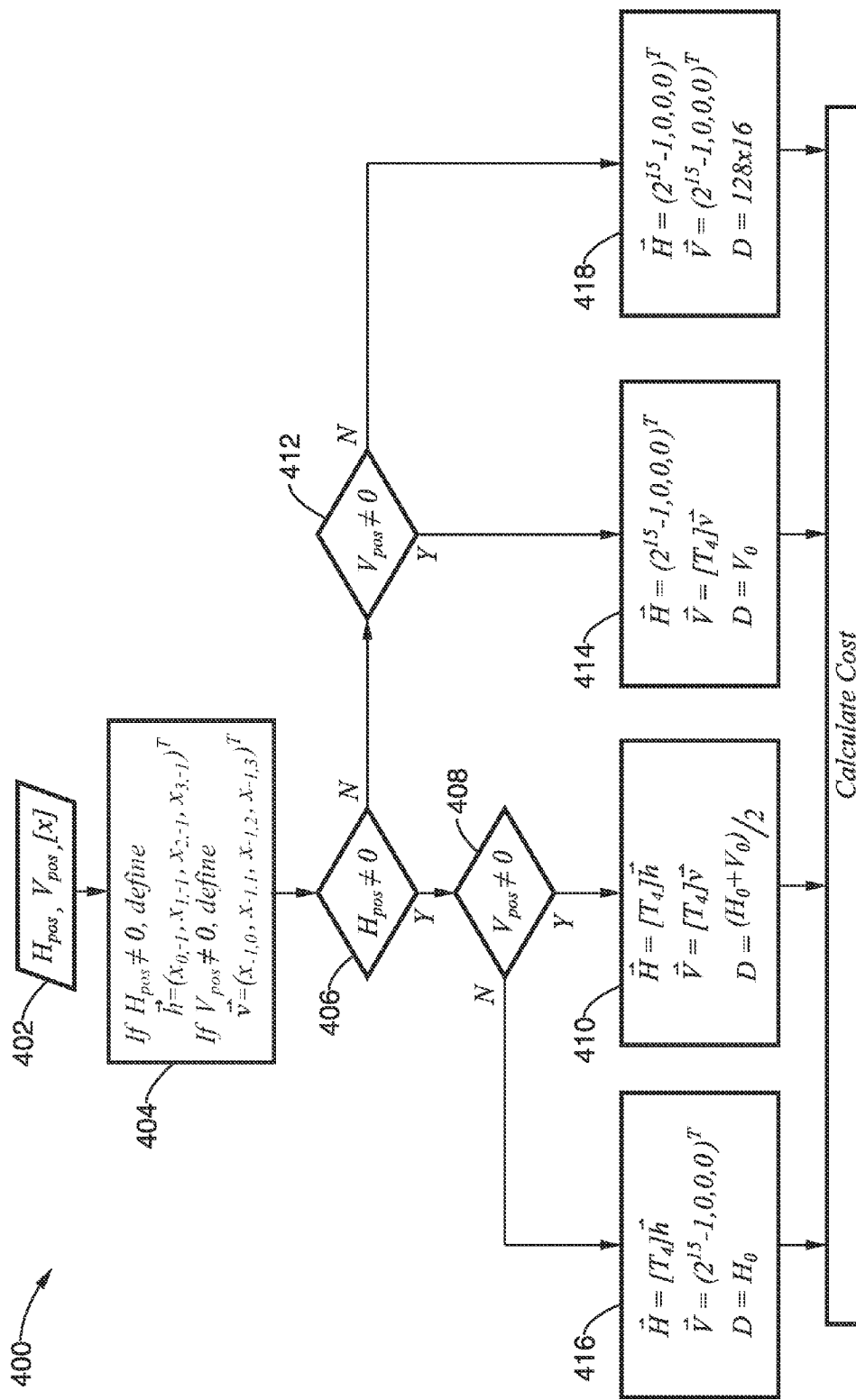

FIG. 4 is a flowchart that details the computation of the frequency domain predictors for the intra vertical, horizontal, and steady state (or DC) intra modes.

Figure 5:
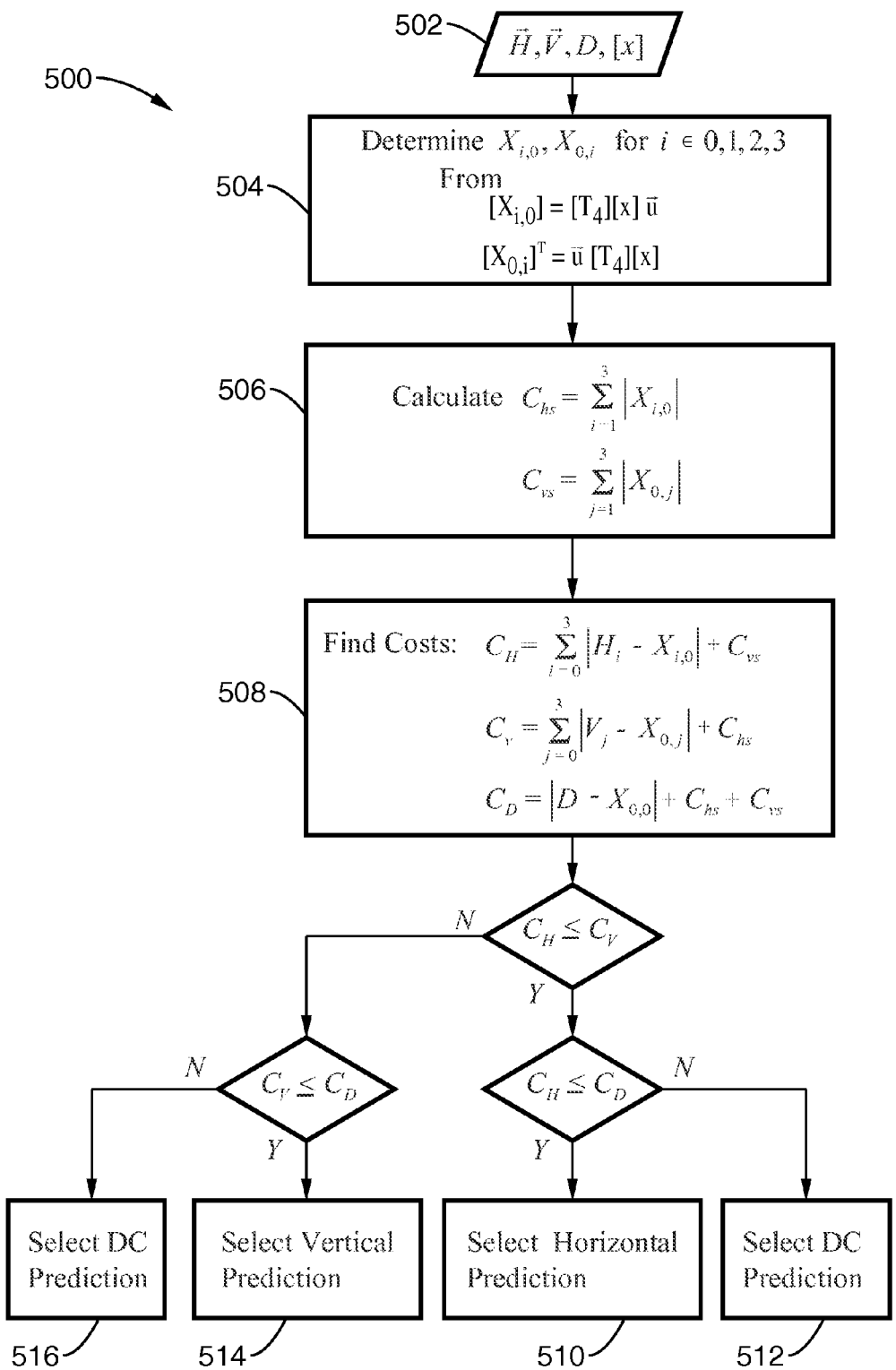

FIG. 5 is a flowchart that predicts the SATD costs of the various horizontal, vertical, or DC predictions 500. Using these costs, it outputs a selected intra mode with the least SATD.

DETAILED DESCRIPTION OF THE INVENTION

Referring more specifically to the drawings, for illustrative purposes the present invention is embodied in the method generally depicted in FIG. 1A through FIG. 5. It will be appreciated that the apparatus may vary as to configuration and as to details of the parts, and that the method may vary as to the specific steps and sequence, without departing from the basic concepts as disclosed herein.

Introduction

In the H.264/AVC video compression standard, the 4×4 intra mode decision is made by performing Lagrangian rate-distortion optimization on each of the 9 intra mode possibilities. The intra mode selected is the one that provides the lowest distortion (SATD) between the original 4×4 input block, and the reconstructed block for a particular intra mode. This process is extremely computationally expensive.

The process described below reduces the computational cost of the 4×4 intra mode decision significantly, from 24 1D 4 point Hadamard transforms to merely 4 of them.

Definitions

"Computer" means any device capable of performing the steps, methods, or producing signals as described herein, including but not limited to: a microprocessor, a microcontroller, a video processor, a digital state machine, a field programmable gate array (FPGA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), flash random access memory (flash RAM); and information transmitted by electromagnetic or optical methods including, but not limited to, wireless transmission, copper wires, and optical fibers.

"SATD" means the Sum of Absolute Transformed Differences, which is a widely used video quality metric used for block-matching in motion estimation for video compression. It works by taking a frequency transform, usually a Hadamard transform, of the differences between the pixels in the original block and the corresponding pixels in the block being used for comparison. The transform itself is often of a small block rather than the entire macroblock. For example, in H.264/AVC, a series of 4×4 blocks are transformed rather than doing a more processor-intensive 16×16 transform.

"DCT" (Discrete Cosine Transformation) means a process that converts images from three-dimensions (3D) to two-dimensions (2D) by using the Discrete Cosine (DC) coefficient to examine the luminance of each block of pixels used to form an image. This process is typically used in MPEG and JPEG image compression.

"Hadamard Transforms" are defined below. Although the Hadamard transform has numerous applications to signal processing and analysis, this application describes specific applications of the Hadamard Transform in the context of video processing, without limitation of other, more general, applications.

Hadamard transforms are used in the intra mode estimation in the Joint Model (JM) of the Advance Video Coding (AVC) encoder. Refer now to FIG. 1A, a Hadamard transform takes an input of 4 pixels (otherwise referred to as pels) and transforms them into a Hadamard Transform of 4 pixels. Similarly, in FIG. 1B, a 4×4 block may also be selectively transformed into a Hadamard Transform of a 4×4 block while outputting only a particular horizontal row and vertical column. In this instance, selected rows or columns of the input 4×4 block may be transformed as described further below. The Hadamard transform inherently possesses characteristics of uniform scaling such that each transform coefficient has the same amplification.

The Hadamard Vector Transform of a 4 pixel input may mathematically be defined in the following manner. Let $\vec{s} = [s_0, s_1, s_2, s_3]^T$ be a vector consisting of 4 elements. The Hadamard transform $[T_4]$ of $\vec{s}$ is defined as $\vec{S} = [S_0, S_1, S_2, S_3]^T = [T_4]\vec{s}$ where $$[T_4] = \begin{bmatrix} 1 & 1 & 1 & 1 \\ 1 & 1 & -1 & -1 \\ 1 & -1 & -1 & 1 \\ 1 & -1 & 1 & -1 \end{bmatrix}.$$

The Hadamard Transformation of a 4×4 Block is defined as follows.

Let [y] be a 4×4 block of pixels such that $$[y] = \begin{bmatrix} y_{0,0} & y_{0,1} & y_{0,2} & y_{0,3} \\ y_{1,0} & & & \\ y_{2,0} & & \ddots & \\ y_{3,0} & & & y_{3,3} \end{bmatrix}.$$

The Hadamard transform $H_{4\times 4}(y)$ of [y] is defined as $$[Y] = \begin{bmatrix} Y_{0,0} & Y_{0,1} & Y_{0,2} & Y_{0,3} \\ Y_{1,0} & & & \\ Y_{2,0} & & \ddots & \\ Y_{3,0} & & & Y_{3,3} \end{bmatrix} = T_{4\times 4}([y]) = [T_4][y][T_4]^T$$

where $$\begin{bmatrix} Y_{0,0} \\ Y_{1,0} \\ Y_{2,0} \\ Y_{3,0} \end{bmatrix} = [T_4][y]\vec{u}, \begin{bmatrix} Y_{0,0} & Y_{0,1} & Y_{0,2} & Y_{0,3} \end{bmatrix} = \vec{u}^T[y][T_4]^T,$$

and $\vec{u}^T = [1\ 1\ 1\ 1]$.

Referring back to FIG. 1B, to selectively determine row zero and column zero of the Hadamard block transform. Here, an input 4×4 pixel block, such as [y], is input. A selection vector $\vec{u}$ is used to selectively determine the column zero Hadamard transform of the input 4×4 pixel block [y], to produce $$\begin{bmatrix} Y_{0,0} \\ Y_{1,0} \\ Y_{2,0} \\ Y_{3,0} \end{bmatrix}.$$

Similarly, selection vector $\vec{u}^T$ is used with the input 4×4 pixel block [y], to produce the row zero Hadamard transform of the input 4×4 pixel block [y], which results in $[Y_{0,0}\ Y_{0,1}\ Y_{0,2}\ Y_{0,3}]$.

The combination of the row zero block Hadamard transform, and the column zero block Hadamard transform is denoted as $T_{RC}$, indicating that only a row and column of the block transformation is to be processed. This may also be referred to as a "pruned" Hadamard transformation.

Process Overview

Figure 2A:
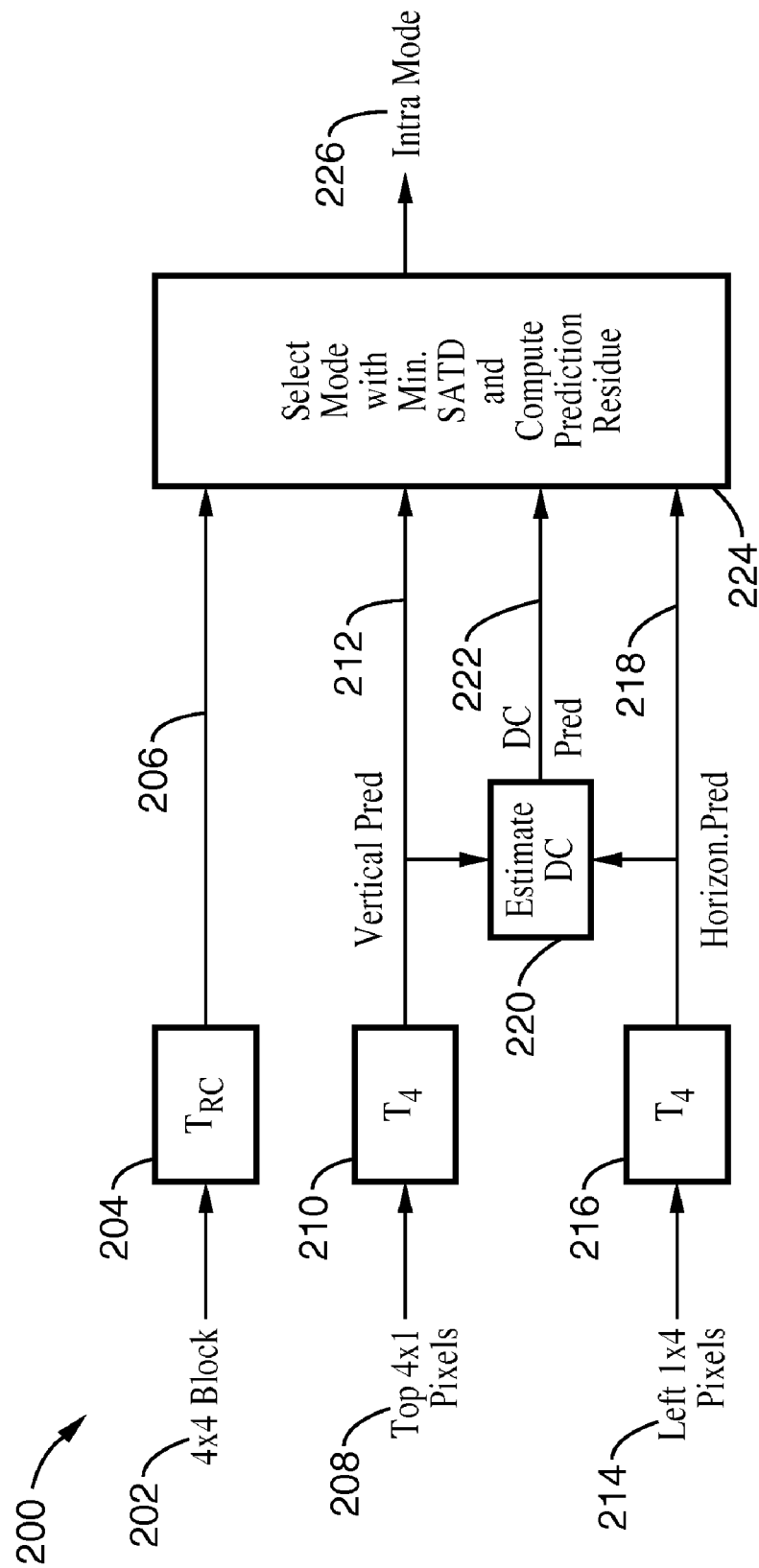
FIG. 2A is an overview flow chart of the intra mode selection method.

Referring now to FIG. 2, an overview of an embodiment of a method of determining an optimal intra mode selection 200 is shown. In the embodiment shown, an input 4×4 block of pixels 202 is used as an input to the pruned 4×4 Hadamard block transformation 204 to produce the vertical and horizontal frequency component of the 4×4 Hadamard block transform output 206. This output 206 will be used subsequently as described below.

The 4×1 pixels 208 (the 4 top elements immediately above the input 4×4 block of pixels 202) are used as input into a $T_4$ Hadamard transform 210 to produce a vertical prediction Hadamard transform output 212.

Similarly, the left 1×4 pixels 214 (the 4 left elements immediately left of the input 4×4 block of pixels 202) are used as input into a $T_4$ Hadamard transform 216 to produce a horizontal prediction Hadamard transform output 218.

$T_4$ Hadamard vertical 212 and horizontal 218 predictions are used to estimate the DC prediction 222.

The following inputs are compared 224 to determine the optimal intra mode prediction 226: 1) the pruned 4×4 Hadamard block transform output 206; 2) the vertical prediction Hadamard transform output 212; 3) the horizontal prediction Hadamard transform output 218; and 4) the DC prediction 222.

Only horizontal 218, vertical 212, and DC 222 predictions are used in the intra DCT mode decision coefficients. The intra predictions are performed in the frequency domain.

Figure 2B:
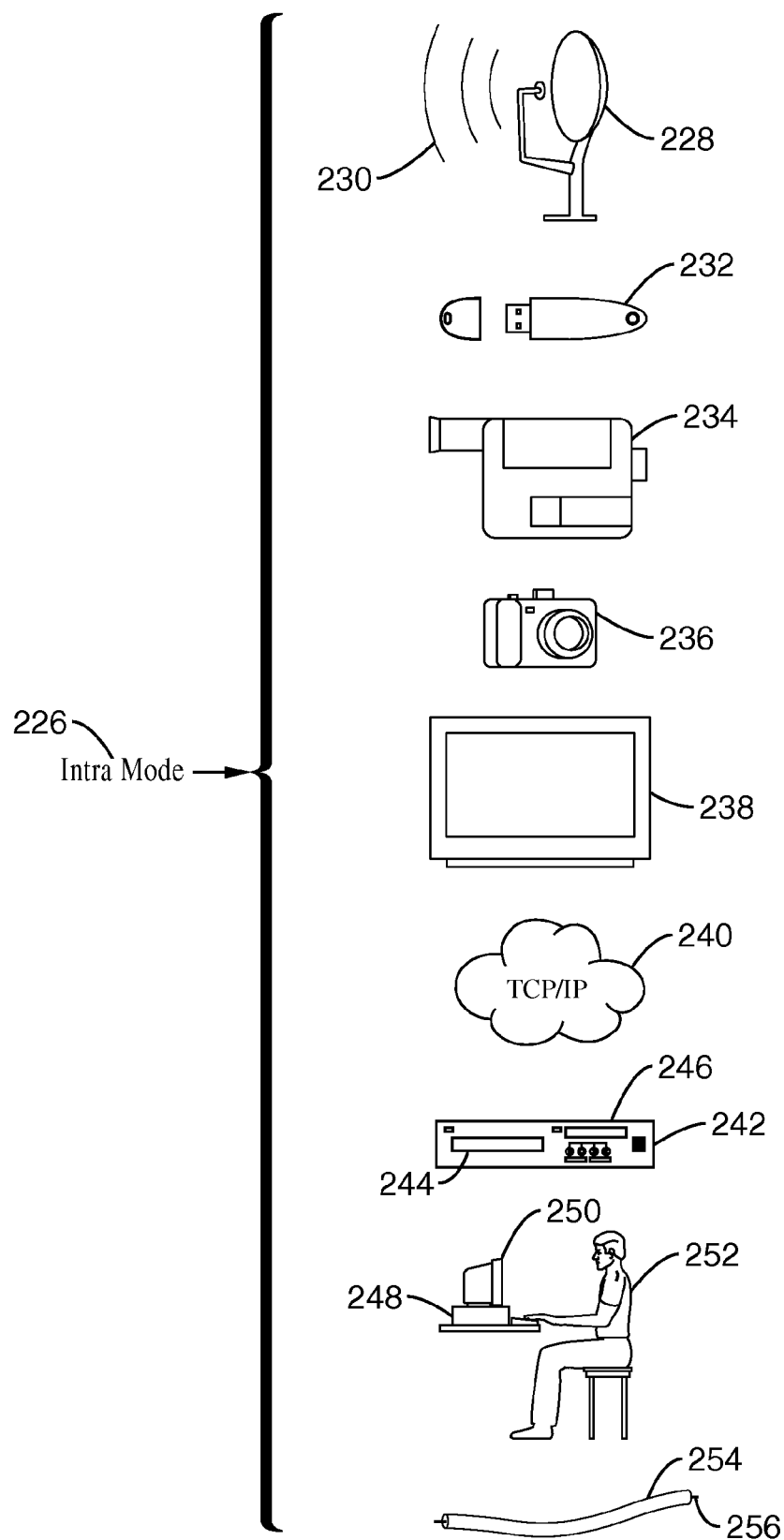
FIG. 2B is a flow chart of the selected intra mode being output to one or more computer readable media.

Refer now to FIG. 2B, which is a diagram of the various computer readable media that the selected intra mode 226 may be output. It may be sent to a microwave transmitter 228 for propagation through microwaves 230 to a distant connection. The intra mode 226 may be stored on a memory device faster or slower than the depicted USB storage device 232, as well as stored on a digital or analog recording medium exemplified as a high definition video recorder 234, or a still or moving digital camera 236. Similarly, the intra mode 226 may be displayed, with or without further processing, on a graphical device such as a plasma or liquid crystal display 238. The intra mode 226 may be transmitted through a network 240, which may be wireless, or may use TCP/IP or other interconnection techniques to any other device in this FIG. 2B. Still another output of the intra mode 226 may be to a multiple media device 242, which may have a VHS video recorder 244, or a DVD recorder 246. Yet another output of the intra mode 226 may be to a computer 248 that may or may not be connected to a display device 250, to be ultimately viewed by a person 252. The computer 248 may itself have a wide variety of computer readable media available for subsequent secondary output of the intra mode 226. Finally, the intra mode 226 may be transmitted through a wired connection 254, which may have one or more conductors 256 of electromagnetic information, ultimately being transmitted to one or more of the devices present in this FIG. 2B.

Estimate the Intra Macroblock DCT Coefficients

To reduce computation, only horizontal, vertical, and DC predictions are used in the estimation of the intra DCT coefficients. In particular, the intra predictions are computed in frequency domain; the DC prediction is derived from the horizontal and vertical predictions. And, finally, the prediction residue with the minimal SATD is selected as the intra mode.

Refer now to FIGS. 3A and 3B, which taken together describe the relationship 300 between the spatial and frequency domain intra predictor for horizontal and vertical modes. Here, an initial spatial domain representation (in FIG. 3A) of an input 4×4 block 302 is shown as [x] with elements $x_{i,j}$, where $i,j \in (0,1,2,3)$. The frequency domain representation (in FIG. 3B) of the 4×4 transformation 304 is shown as the transformed matrix [X], with elements $X_{i,j}$, where $i,j \in (0,1,2,3)$.

For convenience, the 4×1 column vector to the left of vector $(x_{0,0}, x_{1,0}, x_{2,0}, x_{3,0})^T$ with elements $(x_{0,-1}, x_{1,-1}, x_{2,-1}, x_{3,-1})^T$ is denoted as $\vec{h} = (h_0, h_1, h_2, h_3)^T$ 306. The Hadamard transform of h is denoted as $\vec{H} = (H_0, H_1, H_2, H_3)^T$ 308.

Similarly, the 1×4 row vector above 4×4 block [x] 302 are $(x_{-1,0}, x_{-1,1}, x_{-1,2}, x_{-1,3})$, which are for convenience denoted 310 as $\vec{v} = (v_0, v_1, v_2, v_3)$. The Hadamard transform of $\vec{v}$ 312 is denoted $\vec{V} = (V_0, V_1, V_2, V_3)^T$.

Compute Frequency Domain Predictors for the Intra Vertical, Horizontal, and DC Prediction Modes This process may be followed more readily by referring to FIG. 4, which details the computation of the frequency domain predictors for the intra vertical, horizontal, and steady state (or DC) modes 400.

First, input scalar index positions ($H_{pos}, V_{pos}$) of the top left pixels of a 4×4 pixel block [x] in a picture that begins with pixels 0,0 (the upper left corner of the picture in the H.264 design specification) and continues to pixel position values m,n. Also input the pixel block [x] 402.

Next, from the 4 pixels immediately to the left and above the 4×4 pixel block [x] are denoted as 404 $\vec{h} = (h_0, h_1, h_2, h_3)^T$, $\vec{v} = (v_0, v_1, v_2, v_3)$.

At this point, now calculate the horizontal predictor $\vec{H} = [H_0, H_1, H_2, H_3]^T$, the vertical predictor $\vec{V} = [V_0, V_1, V_2, V_3]^T$, and the steady state (DC) predictor D as follows:

If $H_{pos} \neq 0$ (406) and $V_{pos} \neq 0$ (408), then:

$$\vec{H} = [T_4]\vec{h}$$

$$\vec{V} = [T_4]\vec{v}$$

$$D = (H_0 + V_0)/2$$

at (410).

If $H_{pos}=0$ (e.g., not $H_{pos}\neq 0$ at 406) and $V_{pos}\neq 0$ (at 412), then:

$$\vec{H}=[2^{15}-1,0,0,0]^T$$

$$\vec{V}=[T_4]\vec{v}$$

$$D=V_0$$

at (414).

If $H_{pos}\neq 0$ (406) and $V_{pos}=0$ (e.g., not $V_{pos}\neq 0$ at 408), then:

$$\vec{H}=[T_4]\vec{h}$$

$$\vec{V}=[2^{15}-1,0,0,0]^T$$

$$D=H_0$$

at (416).

If $H_{pos}=0$ (e.g., not $H_{pos}\neq 0$ at 406) and $V_{pos}=0$ (e.g., not $V_{pos}\neq 0$ at 412), then:

$$\vec{H}=[2^{15}-1,0,0,0]^T$$

$$\vec{V}=[2^{15}-1,0,0,0]^T$$

$$D=128\times 16$$

at (418).

Here, it is assumed that the pixels can only take on 8 bits of information. In particular, the DC predictor $2^{15}-1$ appearing in block 418 corresponds to the DC prediction for 8 bits per pixel. The predictor $\vec{H}=[2^{15}-1,0,0,0]^T$ in 414, 418, and the predictor $\vec{V}=[2^{15}-1,0,0,0]^T$ in 416, 418, are selected to make sure that they will have sufficiently large intra prediction cost for 8 bits per pixel, and consequently the corresponding prediction mode will not be selected as the minimal cost intra prediction mode in FIG. 5. This is consistent with the H.264/AVC standard.

Regardless of which calculation branch was taken from 410, 414, 416, or 418, next the cost is calculated 420.

Compute Intra Prediction Cost

Refer now to FIG. 5, which predicts the computational costs of the various horizontal, vertical, or DC predictions 500, and using these, outputs a selected intra mode with least SATD. To this evaluation is provided the $\vec{H}$, $\vec{V}$, D values determined above, as well as the input 4×4 pixel block [x], block 502. Next, the values of $X_{i,0}$, $X_{0,i}$ for $i\in 0, 1, 2, 3$ are determined 504 using the relationship described above for the pruned Hadamard block transform, i.e.

$$\begin{bmatrix} X_{0,0} \\ X_{1,0} \\ X_{2,0} \\ X_{3,0} \end{bmatrix} = [T_4][x]\vec{u} \text{ and } [X_{0,0}\ X_{0,1}\ X_{0,2}\ X_{0,3}] = \vec{u}[x][T_4]^T.$$

Cost precursors are then formed 506

$$C_{hs}=\sum_{i=1}^{3}|X_{i,0}| \text{ and } C_{vs}=\sum_{j=1}^{3}|X_{0,j}|.$$

Finally, the costs are calculated 508, where the cost of the horizontal prediction is $$C_H=\sum_{i=0}^{3}|H_i-X_{i,0}|+C_{vs},$$

the cost of the vertical prediction is $$C_V=\sum_{j=0}^{3}|V_j-X_{0,j}|+C_{hs},$$

and the cost of the DC prediction is $C_D=[|D-X_{0,0}|]+C_{hs}+C_{vs}$.

Once the predicted costs are determined, the appropriate intra mode is selected from the group of Horizontal Prediction, Vertical Prediction, and DC Prediction.

Minimal Cost Intra Mode Prediction

The intra mode with the minimal cost is selected as the intra prediction mode. In particular:

If $C_H\leq C_V$ and $C_H\leq C_D$, then select Horizontal Prediction 510;

If $C_H\leq C_V$ and $C_H>C_D$, then select DC Prediction 512;

If $C_H>C_V$ and $C_V\leq C_D$, then select Vertical Prediction 514; and finally, If $C_H>C_V$ and $C_V>C_D$, select DC Prediction 516.

The minimal cost prediction among $C_H$, $C_V$, and $C_D$ is then output as the appropriate associated predicted intra mode. From this point, the selected intra mode is used within the advanced video encoder to compress the 4×4 block.

Discussion

As previously described, in the H.264/AVC video compression standard the 4×4 intra mode decision is made by performing Lagrangian rate-distortion optimization on each of the 9 intra mode possibilities. The intra mode selected is the one that provides the lowest SATD between the original 4×4 input block, and the reconstructed block for a particular intra mode, where SATD is directly computed as the sum of absolute value of the transform of the difference. This process is extremely computationally expensive.

For selecting among the horizontal, vertical, and DC intra modes with the direct method, each SATD of these intra modes is separately computed with a 4×4 Hadamard block transform for a total of three 2D Hadamard transforms.

Each 2D 4×4 Hadamard transform is computationally equivalent to 8 of the 1D 4 point Hadamard transforms when row and column decomposition is used for the 2d transform.

In this process, the SATD is computed as the sum of the absolute value of difference of the transform coefficients, and only the horizontal, vertical, and DC transform coefficients are computed using 1D 4 point Hadamard transform. Thus, this process reduces the number of equivalent 1D Hadamard transforms of the horizontal, vertical, and DC intra modes from 24 to 4 by performing the intra mode prediction in the frequency domain, while providing the same intra mode selection as direct calculations of SATD.

Conclusion

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. In the appended claims, reference to an element in the singular is not intended to mean "one and only one" unless explicitly so stated, but rather "one or more." All equivalents to the elements of the above-described preferred embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for selecting an intra mode in a video image encoder, comprising:
   a computer processor; and
   programming executable on said computer processor for:
   (a) selecting a lowest Sum of Absolute Transformed Differences (SATD) intra mode among intra modes using inputs [x], $H_{pos}$, $V_{pos}$, h(bar), and v(bar);
   (b) wherein [x] is a 4×4 block of pixels within a picture and $$[x] \equiv \begin{bmatrix} x_{0,0} & x_{0,1} & x_{0,2} & x_{0,3} \\ x_{1,0} & x_{1,1} & x_{1,2} & x_{1,3} \\ x_{2,0} & x_{2,1} & x_{2,2} & x_{2,3} \\ x_{3,0} & x_{3,1} & x_{3,2} & x_{3,3} \end{bmatrix}$$

(c) wherein $H_{pos}$ is a horizontal pixel position of the 4×4 lock within the image;
   (d) wherein $V_{pos}$ is a vertical pixel position of the 4×4 block within the image;
   (e) wherein $\vec{h}$ is a horizontal vector immediately left of the 4×4 block [x], defined as $\vec{h} \equiv (x_{0,-1}, x_{1,-1}, x_{2,-1}, x_{3,-1},)^T$ relative to the indexing of the elements of [x];
   (f) wherein $\vec{v}$ is a horizontal vector immediately above the 4×4 block [x], defined as $\vec{v} \equiv (x_{-1,0}, x_{-1,1}, x_{-1,2}, x_{-1,3})^T$ relative to the indexing of the elements of [x]; and
   (g) wherein the lowest SATD intra mode is determined among a group comprising:
      i. a horizontal intra mode;
      ii. a vertical intra mode; and
      iii. a steady state (DC) intra mode; and
   (h) outputting the lowest SATD intra mode to a non-transitory computer readable medium.

2. The system of claim 1, wherein said outputting step comprises:
   (a) calculating a horizontal predictor $\vec{H} \equiv (H_0, H_1, H_2, H_3)^T$, a vertical predictor $\vec{V} \equiv (V_0, V_1, V_2, V_3)^T$, and a steady state (DC) predictor D;
   (b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and
   (c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

3. The system of claim 2, wherein the calculating of the horizontal predictor $\vec{H}$, the vertical predictor $\vec{V}$, and the steady state (DC) predictor D comprises:
   if $H_{pos} \neq 0$ and $V_{pos} \neq 0$ then:
      i. setting $\vec{H} \equiv (H_0, H_1, H_2, H_3)^T = [T_4]\vec{h}$,
         where $\vec{h} \equiv (h_0, h_1, h_2, h_3)^T \equiv (x_{0,-1}, x_{1,-1}, x_{2,-1}, x_{3,-1})^T$;
      ii. setting $\vec{V} \equiv (V_0, V_1, V_2, V_3)^T = [T_4]\vec{v}$,
         where $\vec{v} \equiv (v_0, v_1, v_2, v_3) \equiv (x_{-1,0}, x_{-1,1}, x_{-1,2}, x_{-1,3})^T$; and
      iii. setting $D = (H_0 + V_0)/2$.

4. The system of claim 2, wherein the calculating of the horizontal predictor $\vec{H}$, the vertical predictor $\vec{V}$, and the steady state (DC) predictor D comprises:
   if $H_{pos} = 0$ and $V_{pos} \neq 0$ then:
      i. setting $\vec{H} = (2^{15} - 1, 0, 0, 0)^T$;
      ii. setting $\vec{V} \equiv (V_0, V_1, V_2, V_3)^T = [T_4]\vec{v}$,
         where $\vec{v} \equiv (v_0, v_1, v_2, v_3) \equiv (x_{-1,0}, x_{-1,1}, x_{-1,2}, x_{-1,3})^T$; and
      iii. setting $D = V_0$.

5. The system of claim 2, wherein the calculating of the horizontal predictor $\vec{H}$, the vertical predictor $\vec{V}$, and the steady state (DC) predictor D comprises:
   if $H_{pos} \neq 0$ and $V_{pos} = 0$ then:
      i. setting $\vec{H} \equiv (H_0, H_1, H_2, H_3)^T = [T_4]\vec{h}$,
         where $\vec{h} \equiv (h_0, h_1, h_2, h_3)^T \equiv (x_{0,-1}, x_{1,-1}, x_{2,-1}, x_{3,-1})^T$;
      ii. setting $\vec{V} = (2^{15} - 1, 0, 0, 0)^T$; and
      iii. setting $D = H_0$.

6. The system of claim 2, wherein the calculating of the horizontal predictor $\vec{H}$, the vertical predictor $\vec{V}$, and v steady state (DC) predictor D comprises:
   if $H_{pos} = 0$ and $V_{pos} = 0$ then:
      i. setting $\vec{H} = (2^{15} - 1, 0, 0, 0)^T$;
      ii. setting $\vec{V} = (2^{15} - 1, 0, 0, 0)^T$; and
      iii. setting $D = 128 \times 16$.

7. The system of claim 2, wherein the calculating of the horizontal cost precursor $C_{hs}$ and the vertical cost precursor $C_{vs}$ comprises:
   (a) calculating the values $X_{i,0}$, $X_{0,i}$ for $i \in 0,1,2,3$ using the relationships $$\begin{bmatrix} X_{0,0} \\ X_{1,0} \\ X_{2,0} \\ X_{3,0} \end{bmatrix} = [T_4][x]\vec{u} \text{ and } [X_{0,0} \quad X_{0,1} \quad X_{0,2} \quad X_{0,3}] = \vec{u}[x][T_4]^T,$$

(i) wherein $\vec{u}^T = [1\ 1\ 1\ 1]$, and
   (ii) wherein $$[T_4] = \begin{bmatrix} 1 & 1 & 1 & 1 \\ 1 & 1 & -1 & -1 \\ 1 & -1 & -1 & 1 \\ 1 & -1 & 1 & -1 \end{bmatrix};$$

(b) calculating the horizontal cost precursor $$C_{hs} = \sum_{i=1}^{3} |X_{i,0}|; \text{ and}$$

(c) calculating the vertical cost precursor $$C_{vs} = \sum_{j=1}^{3} |X_{0,j}|.$$

8. The system of claim 2, wherein the calculating the horizontal intra mode cost $C_H$ comprises:
calculating $$C_H = \sum_{i=0}^{3} |H_i - X_{i,0}| + C_{vs}.$$

9. The system of claim 2, wherein the calculating the vertical intra mode cost $C_V$ comprises:
calculating $$C_v = \sum_{j=0}^{3} |V_j - X_{0,j}| + C_{hs}.$$

10. The system of claim 2, wherein the calculating the steady state (DC) intra mode cost $C_D$ comprises:
calculating $C_D=|D-X_{0,0}|+C_{hs}+C_{vs}$.

11. The system of claim 2, further comprising:
selecting the lowest SATD intra mode with a lowest associated intra mode cost among the group consisting of: the horizontal intra mode cost $C_H$, the vertical intra mode cost $C_V$, and the steady state (DC) intra mode cost $C_D$.

12. A system as recited in claim 1, wherein the system comprises an advanced video encoder.

13. A system for selecting an intra mode in a video image encoder, comprising:
a computer processor; and
programming executable on said computer processor for:
(a) selecting a lowest Sum of Absolute Transformed Differences (SATD) intra mode among intra modes using inputs [x], $H_{pos}$, $V_{pos}$, $\vec{h}$, and $\vec{v}$;
(b) wherein [x] is a p×q block of pixels within a picture with indices $x_{i,j}$ for i∈0,1,2, . . . , p−1, j∈0,1,2, . . . , q−1; and $$[x] \equiv \begin{bmatrix} x_{0,0} & x_{0,1} & \cdots & x_{0,q-1} \\ x_{1,0} & x_{1,1} & \cdots & x_{1,q-1} \\ \vdots & \vdots & \ddots & x_{2,q-1} \\ x_{p-1,0} & x_{p-1,1} & x_{p-1,2} & x_{p-1,q-1} \end{bmatrix}$$

(c) wherein $H_{pos}$ is a horizontal pixel position of the p×q block within the image;
(d) wherein $V_{pos}$ is a vertical pixel position of the p×q block within the image;
(e) wherein $\vec{h}$ is a horizontal vector immediately left of the p×q block [x], defined as $\vec{h} \equiv (x_{0,-1}, x_{1,-1}, \ldots, x_{p-1,-1})^T$ relative to the indexing of the elements of [x];
(f) wherein $\vec{v}$ is a horizontal vector immediately above the p×q block [x], defined as $\vec{v} \equiv (x_{-1,0}, x_{-1,1}, \ldots, x_{-1,q-1})^T$ relative to the indexing of the elements of [x];
(g) wherein the lowest SATD intra mode is determined among a group comprising:
i. a horizontal intra mode;
ii. a vertical intra mode; and
iii. a steady state (DC) intra mode; and
(h) outputting the lowest SATD intra mode to a non-transitory computer readable medium.

14. The system of claim 13, wherein the selecting step comprises:
(a) calculating a horizontal predictor $\vec{H} \equiv (H_0, H_1, \ldots, H_{p-1})^T$, a vertical predictor $\vec{V} \equiv (V_0, V_1, \ldots, V_{q-1})^T$, and a steady state (DC) predictor D;
(b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and
(c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

15. The system of claim 14, wherein the calculating the horizontal predictor $\vec{H}$, the vertical predictor $\vec{V}$, and the steady state (DC) predictor D comprise:
(a) if $H_{pos} \neq 0$ and $V_{pos} \neq 0$ then:
i. setting $\vec{H} = [T_{pq}]\vec{h}$,
wherein $\vec{h} \equiv (h_0, h_1, \ldots, h_{p-1})^T \equiv (x_{0,0}, x_{1,0}, \ldots, x_{p-1,0})^T$;
ii. setting $\vec{V} = [T_{pq}]\vec{v}$,
wherein $\vec{v} \equiv (v_0, v_1, \ldots, v_{q-1}) \equiv (x_{0,0}, x_{0,1}, \ldots, x_{0,q-1})^T$; and
iii. setting $D = (H_0 + V_0)/2$;
(b) if $H_{pos} = 0$ and $V_{pos} \neq 0$ then:
i. setting $\vec{H} = (2^{15}-1, 0, 0, 0)^T$;
ii. setting $\vec{V} = [T_{pq}]\vec{v}$,
wherein $\vec{v} \equiv (v_0, v_1, \ldots, v_q) \equiv (x_{0,0}, x_{0,1}, \ldots, x_{0,q})^T$; and
iii. setting $D = V_0$;
(c) if $H_{pos} \neq 0$ and $V_{pos} = 0$ then:
i. setting $\vec{H} = [T_{pq}]\vec{h}$,
wherein $\vec{h} \equiv (h_0, h_1, \ldots, h_{p-1})^T \equiv (x_{0,0}, x_{1,0}, \ldots, x_{p-1,0})^T$;
ii. setting $\vec{V} = (2^{15}-1, 0, 0, 0)^T$,
wherein n is defined as $2^n > q \times p \times q \times 2^{b+1}$; and
iii. setting $D = H_0$;
(d) if $H_{pos} = 0$ and $V_{pos} = 0$ then:
i. setting $\vec{H} = (2^{15}-1, 0, 0, 0)^T$;
ii setting $\vec{V} = (2^{15}-1, 0, 0, 0)^T$; and
iii. setting $D = 128 \times 16$.

16. The system of claim 14, wherein the calculating the horizontal cost precursor $C_{hs}$ and the vertical cost precursor $C_{vs}$ comprises:
(a) calculating the values $X_{i,0}$, $X_{0,j}$ for i∈0,1,2, . . . , p−1, j∈0,1,2, . . . , q−1 using the relationship $[X]=[T_{pq}][x][T_{pq}]^T$, where $$[X] \equiv \begin{bmatrix} X_{0,0} & X_{0,1} & \cdots & X_{0,q-1} \\ X_{1,0} & X_{1,1} & \cdots & X_{1,q-1} \\ \vdots & \vdots & \ddots & X_{2,q-1} \\ X_{p-1,0} & X_{p-1,1} & X_{p-1,2} & X_{p-1,q-1} \end{bmatrix};$$

(b) calculating the horizontal cost precursor $$C_{hs} = \sum_{i=1}^{p-1} |X_{i,0}|; \text{ and}$$

(c) calculating the vertical cost precursor $$C_{vs} = \sum_{j=1}^{q-1} |X_{0,j}|.$$

17. The system of claim 14, wherein the calculating the horizontal intra mode cost $C_H$ comprises:
calculating $$C_H = \sum_{i=0}^{p-1} |H_i - X_{i,0}| + C_{vs}.$$

18. The system of claim 14, wherein the calculating the vertical intra mode cost $C_V$ comprises:
calculating $$C_v = \sum_{j=0}^{q-1} |V_j - X_{0,j}| + C_{hs}.$$

19. The system of claim 14, wherein the calculating the steady state (DC) intra mode cost $C_D$ comprises:
calculating $C_D = |D - X_{0,0}| + C_{hs} + C_{vs}$.

20. The system of claim 14, wherein the calculating means comprises:
selecting the lowest SATD intra mode with a lowest associated intra mode cost among the group consisting of: the horizontal intra mode cost $C_H$, the vertical intra mode cost $C_V$, and the steady state (DC) intra mode cost $C_D$.

21. The system of claim 14, wherein:
(a) the p dimension is selected from a group of dimensions consisting of:
2, 4, 8, 16, 32, 64, and 128; and
(b) the q dimension is selected from a group of dimensions consisting of:
2, 4, 8, 16, 32, 64, and 128.

* * * * *